Patented Sept. 1, 1925.

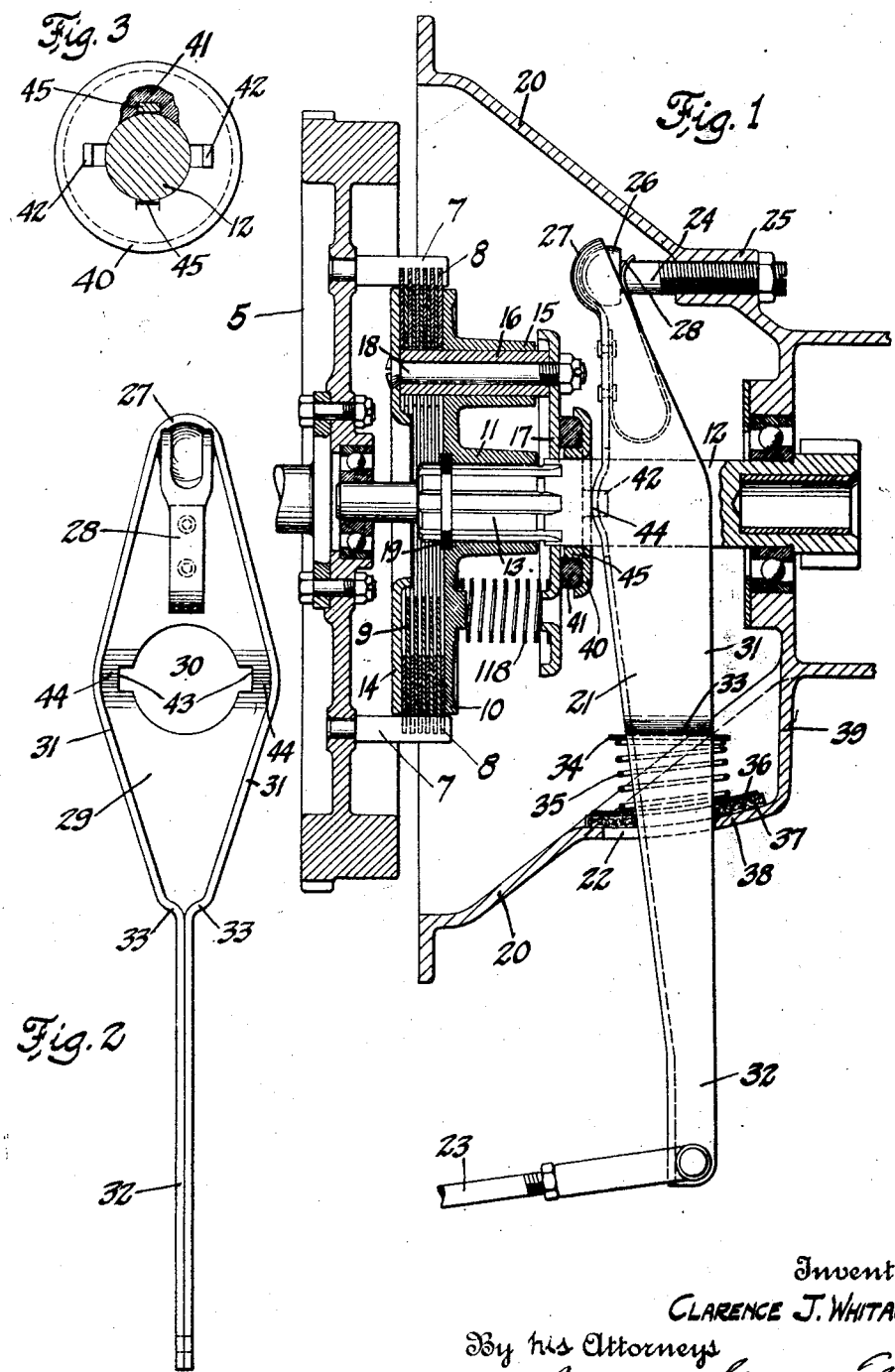

1,552,368

UNITED STATES PATENT OFFICE.

CLARENCE J. WHITACRE, OF DETROIT, MICHIGAN, ASSIGNOR TO GENERAL MOTORS CORPORATION, OF DETROIT, MICHIGAN, A CORPORATION OF DELAWARE.

CLUTCH MECHANISM FOR MOTOR-DRIVEN VEHICLES.

Application filed September 14, 1923. Serial No. 662,696.

*To all whom it may concern:*

Be it known that I, CLARENCE J. WHITACRE, a citizen of the United States, and a resident of Detroit, county of Wayne, and State of Michigan, have invented certain new and useful Improvements in Clutch Mechanism for Motor-Driven Vehicles, of which the following is a full, clear, concise, and exact description, such as will enable others skilled in the art to which the invention relates to make and use the same, reference being made therein to the accompanying drawings, which form a part of this specification.

My invention relates to clutch mechanism intermediate the driving engine and the transmission mechanism of a motor driven vehicle for disconnecting the engine from the transmission mechanism when the gears are to be shifted, or when it is desired to stop the vehicle without stopping the engine, and particularly to a lever and elements accessory thereto associated with the clutch mechanism for interrupting the driving action of the clutch; and the principal object of my invention is to provide an improved lever made, preferably, from a sheet metal blank bent and pressed into proper form by the use of suitable dies, the same being housed within the usual casing provided for enclosing the clutch mechanism, and having associated therewith suitable adjusting mechanism and other features included also in my invention and forming subordinate parts and features thereof.

With the above and other objects of invention in view my invention consists in the improved clutch operating lever and parts and features associated therewith illustrated in the accompanying drawing and hereinafter described and explained; and in such variations and modifications thereof, within the scope of the concluding claims, as will be obvious to those skilled in the art to which my invention relates.

In the drawing accompanying and forming a part of this specification and wherein the preferred embodiment of my invention is illustrated.

Figure 1 is a view mostly in section upon a longitudinally extending plane showing a clutch device and its enclosing casing or housing, the same being equipped with an operating lever and various auxiliary features associated therewith in accordance with my invention.

Figure 2 is a view showing the pressed sheet steel clutch operating lever forming the principal part of my invention by itself, and as seen from a position to the right of Figure 1.

Figure 3 is a view showing a clutch releasing collar included in and forming a part of my invention.

Referring now to the drawing, the reference numeral 5 designates the fly wheel of an engine having a series of laterally extending driving lugs or posts 7 which fit into a like number of recesses or notches in the peripheries of a series of driving clutch discs 8 to thereby form a driving connection between the engine and said discs, as is usual in clutch construction. The driven discs 9 of the clutch are arranged in alternation with the driving discs and between a plate 10 having a tubular projection 11 which is splined to the driven shaft 12 at 13 to thereby drive said shaft, and a ring 14; said plate having a plurality of bearings 15 in which spacing tubes 16 are slidable, and which tubes fit in slots provided in the inner peripheries of the driven clutch discs 9 to thereby provide a driving connection between said discs and the driven member or plate 10. Only one bearing 15 and tube 16 appear in Figure 1, but a plurality of such members spaced circumferentially about the axis of the clutch mechanism is commonly present in clutch mechanism of the type herein referred to.

The reference numeral 17 designates a clutch opening member which is fastened to the ring 14 so as to move therewith by means of bolts 18 extending through the spacing members 16; said ring and opening member being slidable axially of the clutch mechanism to effect the opening and closing of the clutch, as will be understood. Springs 118, as many as may be necessary, act between the driven member 10 and the opening member 17 to press the driving and driven clutch discs together with sufficient force to maintain a normal driving action from the engine through the clutch and to the shaft 12 which acts to drive the change speed transmission gearing of the vehicle, as is usual in motor driven vehicles; and a split ring 19 lying in a groove in the shaft 12 and in a recess in the driven plate 10 forms an abutment for preventing movement of said driven member to the left when the opening member 17 and ring 14 are moved in that direction to open the clutch.

The clutch mechanism is enclosed within a suitable stationary casing or housing 20 the left hand end of which is secured to the engine casing, not shown, and the right hand portion of which is assumed to be prolonged to form a casing for the change speed gearing also not shown; and the shaft 12 is supported in bearings carried by the fly wheel and by a transverse wall of the said casing 20.

The clutch opening or disconnecting member 17 and the ring 14 are moved to the left by a lever 21 which lies for the most part within the casing 20, but extends therefrom through a slot 22 provided in the wall of said casing and to the free end of which an operating rod 23 is connected, said rod being ordinarily operated by a pedal or lever located within reach of the operator of the vehicle. The end of this lever which is within the casing is pivotally supported therefrom, the connection with the casing being shown as comprising a threaded abutment 24 adjustable in a bearing 25 in the casing wall, and having a spherical head 26 which fits in a similar recess 27 formed in the lever at the inner end thereof to thereby permit universal movement at the point of pivotal support provided for said inner end of the operating lever. The end aforesaid of the lever is yieldingly held in engagement with the spherical head 26 by a U-shaped spring 28 fastened to the lever and having a bifurcated free end which straddles the abutment 24 and presses against a flattened surface of the spherical head, as shown in Figure 1.

The lever 21 is made from a suitably shaped blank cut from sheet metal such as sheet steel of proper material and thickness and shaped, as by the use of suitable dies, so as to provide a bottom portion 29 having a hole 30 through which the shaft 12 extends, and side walls 31 extending substantially at right angles to said bottom wall portion and surrounding the same. Beyond the bottom portion 29 these side walls 31, or rather continuations thereof, are brought near to and as shown in substantial contact with one another to provide an extension 32, to the free end of which the operating rod 23 is connected as hereinbefore explained, and whereby shoulders 33 are formed at the points where the side walls merge with the two thicknesses of metal which provide the handle 32 or extension aforesaid. These shoulders form abutments for a stop or washer 34 against which one end of a spring 35 which surrounds the extension 32 bears, and the other end of which acts against a curved plate 36 and packing member 37 to force the packing against a cylindrical area or surface 38 adjacent and surrounding the slot 22 and which area obviously forms a part of the wall of the casing 20, being an outer wall of a protuberance 39 of said wall; whereby a sliding packing is provided at the place where the extension 32 passes out from the casing, as the parts 36 and packing 37 obviously move back and forth with the clutch operating lever.

A cup shaped clutch opening or disconnecting collar 40 having concentric inner and outer walls connected by a bottom wall surrounds the shaft 12 and holds an annular washer 41 of wear resisting material, which bears against the clutch operating member or plate 17; which plate obviously rotates with the fly wheel and shaft 12 when the clutch discs are forced together by the springs 118. The washer 41 and its holding member, however, are shown as restrained from rotation by lugs 42 extending from the bottom wall of the collar 40 and which lugs enter recesses 43 extending out from the hole 30 and by other lugs 45 extending also from said bottom wall and lying within recesses in said washer. The bottom wall 29 of the lever 21 is provided with curved projections 44 which bear against the collar 40 and serve to maintain a line contact therewith as the lever is moved to open the clutch by force transmitted through said lever and projections and the opening member 17, and to the ring 14, upon movement of the free end 32 of the lever to the left, as will be appreciated.

Having thus described and explained my invention, I claim and desire to secure by Letters Patent:

1. A clutch operating lever of the class described formed from sheet metal and having a bottom wall or portion provided with an opening, side walls surrounding and extending at right angles to said bottom wall, and an extending portion formed by continuations of said side walls.

2. A clutch operating lever of the class described formed from sheet metal and having a bottom wall or portion provided with an opening, side walls surrounding and extending at right angles to said bottom wall, and an extending portion formed by continuations of said side walls; said bottom wall having a spherical recess or depression at one end of the lever.

3. A clutch operating lever of the class described formed from sheet metal and having a bottom wall or portion provided with an opening, side walls surrounding and extending at right angles to said bottom wall, and an extending portion formed by continuations of said side walls; said bottom wall having curved projecting portions adjacent and disposed upon opposite sides of the opening aforesaid.

4. A clutch operating lever of the class described formed from sheet metal and having a bottom wall or portion provided with an opening, side walls surrounding and extending at right angles to said bottom wall, an extending portion formed by continuations of said side walls extending parallel with and arranged adjacent one another, and shoulders located at the points where said side walls merge with the sides of the extending portion.

5. A clutch operating lever of the class described formed from sheet metal and having a bottom wall or portion provided with an opening, side walls surrounding and extending at right angles to said bottom wall, an extending portion formed by continuations of said side walls extending parallel with and arranged adjacent one another, and shoulders located at the points where said side walls merge with the sides of said extending portion; said lever having curved projections located adjacent and upon opposite sides of the opening aforesaid, and a spherical recess or depression at the end thereof opposite said extending portion.

6. A clutch operating lever of the class described formed from sheet metal and having a bottom wall or portion provided with an opening, side walls surrounding and extending at right angles to said bottom wall, an extending portion formed by continuations of said side walls extending parallel with and arranged adjacent one another, and shoulders located at the points where said side walls merge with the sides of said extending portion; said lever having a spherical recess or depression formed in the bottom wall aforesaid adjacent one end thereof, and a U-shaped spring secured to said bottom wall and the free end of which lies over said depression.

7. A clutch operating lever of the class described formed from sheet metal and having a bottom wall or portion provided with an opening, side walls surrounding and extending at right angles to said bottom wall, and an extending portion formed by continuations of said side walls; said lever having a spherical recess or depression at the end thereof opposite said extending portion, and a spring one end of which is fixedly secured thereto and the free end of which lies over the recess aforesaid.

8. A clutch operating lever of the class described having a bottom wall or portion provided with an opening, side walls surrounding and extending at right angles to said bottom wall, and an extending portion formed by continuations of said side walls.

9. A clutch operating lever of the class described having a bottom wall or portion provided with an opening, side walls surrounding and extending at right angles to said bottom wall, an extending portion formed by continuations of said side walls extending parallel with and arranged adjacent one another, and shoulders located at the points where said side walls merge with the sides of said extending portion.

10. A clutch operating lever of the class described having a bottom wall or portion provided with an opening, side walls surrounding and extending at right angles to said bottom wall, and an extending portion with which said side walls merge.

11. A clutch operating lever of the class described having a bottom wall or portion provided with an opening, side walls surrounding and extending at right angles to said bottom wall, an extending portion with which said side walls merge, and shoulders located at the points where said side walls merge with said extending portion.

12. A clutch operating lever of the class described having a bottom wall or portion provided with an opening, side walls surrounding and extending at right angles, to said bottom wall, an extending portion with which said side walls merge, and shoulders located at the points where said side walls merge with said extending portion; said lever having a spherical recess or depression at the end thereof opposite said extending portion, and a U-shaped spring secured to the bottom wall aforesaid, and the free end of which lies over said spherical recess.

13. A clutch operating lever of the class described having a bottom wall or portion provided with an opening, side walls surrounding and extending at right angles to said bottom wall, an extending portion with which said side walls merge, and shoulders located at the points where said side walls merge with said extending portion; said lever having a spherical recess or depression formed in said bottom wall at the end thereof opposite said extending portion, and curved projecting portions extending from said bottom wall and located upon opposite sides of the opening aforesaid.

In testimony whereof I affix my signature.

CLARENCE J. WHITACRE.